United States Patent

Molee et al.

[11] Patent Number: 5,267,756
[45] Date of Patent: Dec. 7, 1993

[54] AUTHENTICATION SYSTEM

[75] Inventors: Warren F. Molee, Laguna Niguel; Stuart M. Ellis, Carlsbad, both of Calif.

[73] Assignee: The Upper Deck Company, Carlsbad, Calif.

[21] Appl. No.: 954,114

[22] Filed: Sep. 30, 1992

[51] Int. Cl.$^5$ ............................................ B42D 15/00
[52] U.S. Cl. .................................... 283/86; 283/74
[58] Field of Search .................... 283/86, 67, 70, 74, 283/75, 79; 359/2

[56] References Cited

U.S. PATENT DOCUMENTS 5,128,779  7/1992  Mallik ........................... 283/86 X
5,145,212  9/1992  Mallik ........................... 359/2 X

FOREIGN PATENT DOCUMENTS 0403134  12/1990  European Pat. Off. ............ 283/86

Primary Examiner—Mark Rosenbaum
Assistant Examiner—Willmon Fridie, Jr.
Attorney, Agent, or Firm—Cahill, Sutton & Thomas

[57] ABSTRACT

An authentication system, method and article for memorabilia and other forms of articles wherein a hologram is affixed to the article with a tamper-proof adhesive. The hologram has thereon a unique code number. A certificate of authenticity is provided with the article and it includes a like or different hologram, but with a matching unique code number. A master record or list of the unique code number and related article to which the code number applies is maintained by an entity which also provides a registration "hotline." A purchaser of the article can register that article, and at any time in the future when the article is sold or otherwise transferred its authenticity can be verified through the registration hotline.

11 Claims, 2 Drawing Sheets

AUTHENTICATION SYSTEM

The present invention relates to authentication systems, and more particularly to authentication systems and methods for articles, such as memorabilia.

BACKGROUND OF THE INVENTION

There is a substantial market in and for memorabilia and other articles, such as autographed sports items like baseballs, footballs, jerseys, and other articles. Unfortunately, it is all too easy to counterfeit such articles. For example, the signature of a famous baseball player on a baseball can be duplicated and replicated on other baseballs, and it is very difficult if not virtually impossible to determine whether the subsequent article is genuine or not. A system or method whereby the authenticity of an article such as this could be easily verified would be useful but is not available today.

SUMMARY OF THE INVENTION

Accordingly, an object of the present invention is to provide an authentication system or method for articles.

Another object of this invention is to provide an authentication system or method for memorabilia articles.

Another object of this invention is to provide a memorabilia article with verifiable authentication indicia.

A further object of this invention is to provide an improved certificate of authentication for an article.

Briefly, according to an exemplary embodiment of the present invention, an article is provided with a hologram which is affixed to the article with an adhesive so as to be tamper proof, and the hologram has thereon a unique code number. Accompanying the article is a certificate of authenticity with a like or different hologram but with a matching code number. A master record or list of the unique code number and related article to which the code number applies is maintained by an entity which also provides a registration "hotline". The customer who purchases the article can register the same by mail or telephone With the entity and, at any time in the future when the article is sold or otherwise transferred, its authenticity can be verified through the registration hotline.

BRIEF DESCRIPTION OF DRAWINGS

These and other features, objects, and advantages of the present invention will become better understood through a consideration of the following description taken in conjunction with the drawings in which.

Figure 1:
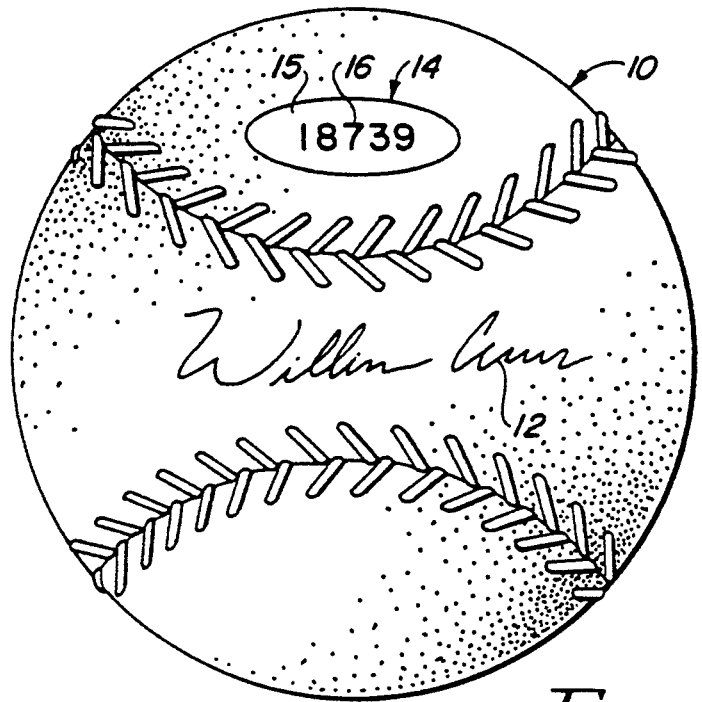
FIG. 1 is a drawing of an exemplary memorabilia item comprising a baseball having an authentication hologram and unique code number thereon according to the present invention.

Turning now to the drawings, an exemplary memorabilia item in the form of a conventional baseball 10 is illustrated in FIG. 1. The baseball in this example has an autograph 12 thereon, such as the autograph of a famous baseball player. The entity which maintains the registration hotline, such as the assignee of the present application The Upper Deck Company, preferably will have the article, the baseball in this instance, signed in the presence of an employee of that entity as a witness and so that the article, the person signing, and a unique code number for the article can be witnessed and entered into the entity's records.

A hologram 14 featuring a form of holographic image, trademark, logo or the like 15 is affixed with a conventional adhesive to the baseball 10 so as to be tamper proof. Furthermore, a unique product code number 16 (e.g., 18739 as shown, or an alpha numeric number) is imprinted on the hologram in a conventional manner. Through the use of a tamper proof hologram, the hologram 14 cannot be removed or copied without at least partially destroying the hologram. These tamper proof holograms are well known and comprise a hologram on a substrate with an overlying clear film. The hologram cannot be identically replicated, and the code number is printed on the surface of the film so that attempted removal of the hologram will result in removal of the film. The code number is unique and is not used again for another article.

Figure 2:
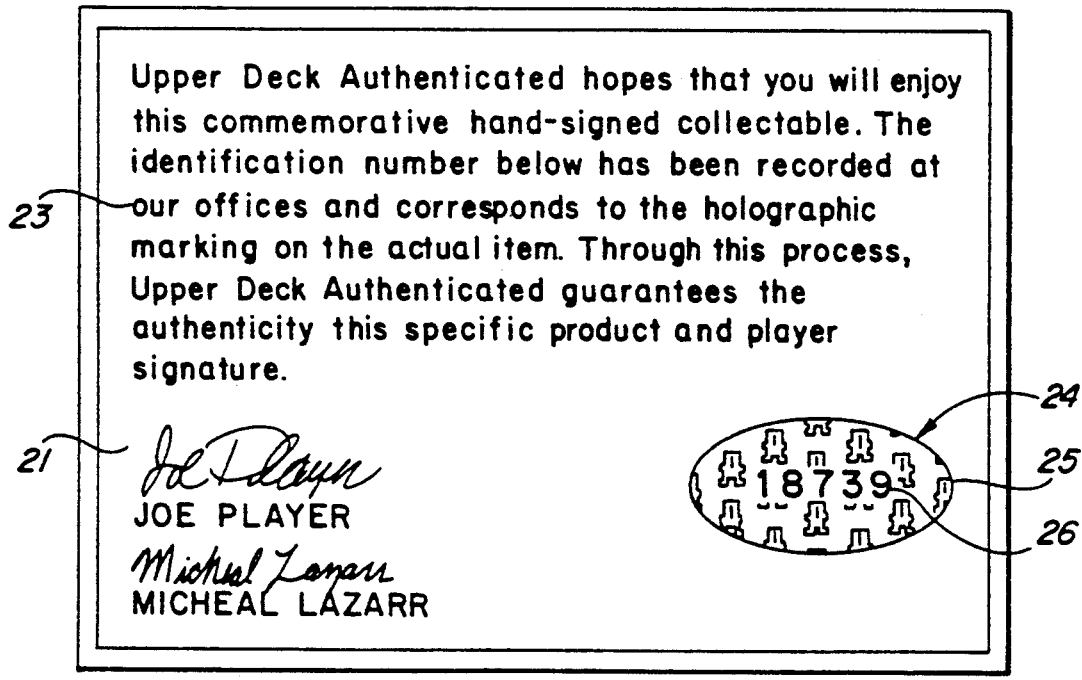
FIGS. 2 and 3 show an exemplary certificate of authenticity for the item of FIG. 1.
Figure 3:
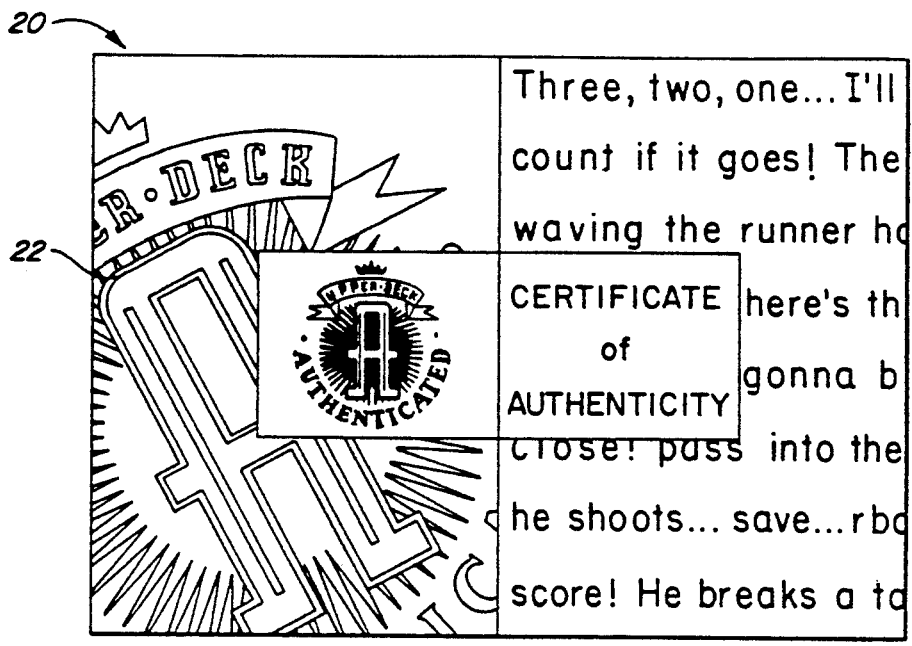

A certificate of authenticity 20 as shown in FIGS. 2 and 3 having front and back sides 21 and 22 accompanies the memorabilia article, the baseball 10 in this instance. This certificate on one side 21 bears a hologram 24 with an image, logo or the like 25 which may be identical to or different from the image 15 of the hologram 14 on the ball 10 ad which also is tamper proof. However, the hologram 24 bears an identical product code number 26 (e.g., 18739) to that on the hologram 14 of the baseball 10. Preferably the holograms 14 and 24 have a similar shape. Every memorabilia article has a different unique code number (even if these articles comprise identical baseballs with original signatures of the same star). The front side 21 preferably has a suitable statement 23 about the authenticity of the article. The back side 22 of the certificate of authenticity can have any suitable identification, wording, logo or the like, such as that shown.

The memorabilia article and certificate are packed together, in this case the baseball 10 and certificate 20. Further, the product code number (e.g., 18739) is recorded at the registration entity, in this instance for example, as "Baseball, hand-signed by Reggie Jackson in Sep. 1992." The product comprising the baseball 10 and certificate 20 then is shipped to the customer. The customer, John Doe, can contact the registration hotline by mail or telephone (preferably an 800 number) to register the ball code number in the name of the customer. Subsequently, if that customer decides to sell the ball to another party, that other party can telephone or write to the registration hotline to confirm what item No. 18739 is and its authenticity. Then the registration hotline operator checks the listing or database of numbers and memorabilia items and confirms that item No. 18739 is a "Baseball, hand-signed by Reggie Jackson in Sep. 1992."

Figure 4:
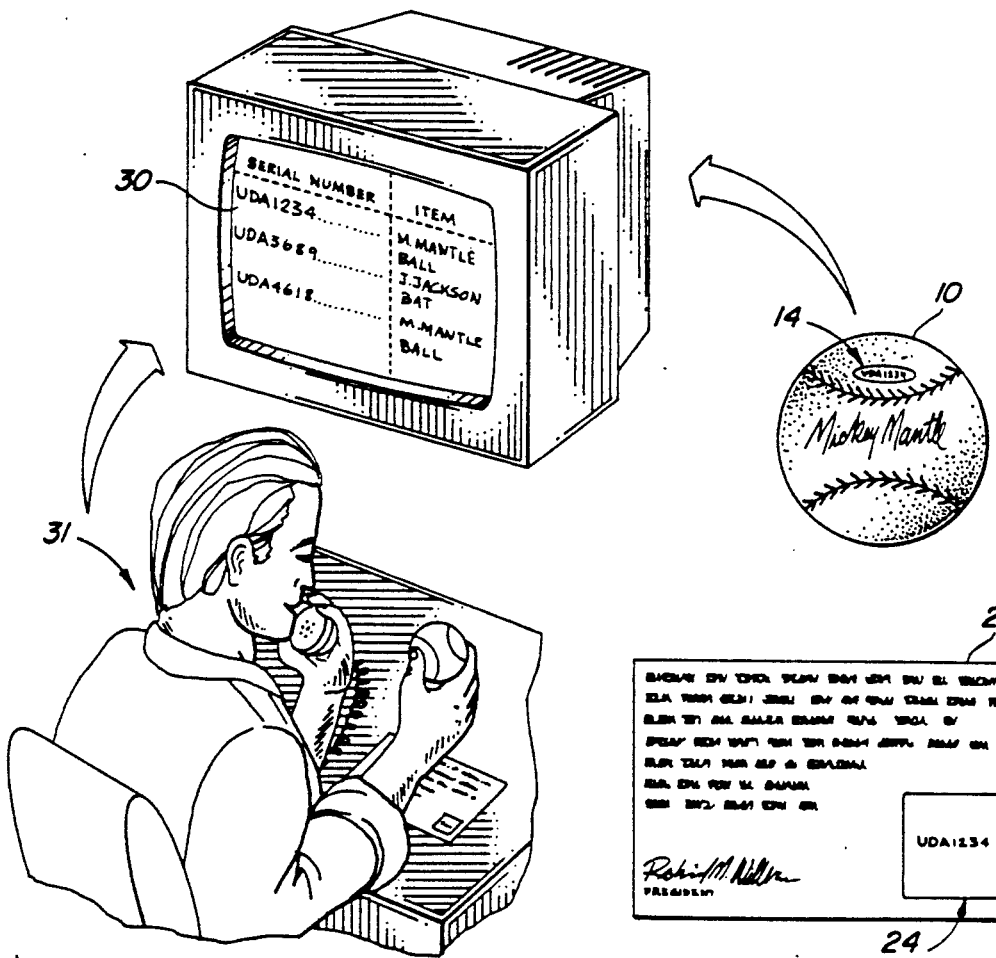
FIG. 4 is a flow diagram of an embodiment of the invention.

FIG. 4 is a simplified flow diagram illustrating the memorabilia item 10 in the form of a baseball signed by Mickey Mantle and with a hologram 14 with a unique code number UDA12345. This Figure also illustrates the associated certificate of authenticity 20 bearing a like or different hologram 24 but with an identical code number UDA12345. Furthermore, this Figure illustrates the database or list of code numbers and the identity or descriptions of the associated item as illustrated at 30 on a computer display. As described above, the customer or owner 31 upon purchasing the memorabilia item 10 may at any time check the authenticity of a memorabilia item 10 via the database or list 30 at the hotline.

Accordingly, the present system and method provides articles with a hologram and unique number, along with a certificate bearing a hologram and like unique number, to enable a customer to verify the authenticity of the article in a simple and efficient manner.

While embodiments of the present invention have been shown and described, various modifications may be made without departing from the scope of the present invention, and all such modifications and equivalents are intended to be covered.

What is claimed is:

1. An authentication system for an article comprising an article for which authentication may be desired,
   a halogram affixed to the article with an adhesive to be tamper proof, the hologram having imprinted thereon a unique code number,
   a certificate of authenticity for the article, and including thereon a hologram with an identical unique code number, and
   a list of unique code numbers with a statement of the respective products to which each unique code number applies.

2. A system as in claim 1 wherein the hologram on the article and the hologram on the certificate of authenticity have images which are identical.

3. A system as in claim 1 wherein the hologram on the article and the hologram on the certificate of authenticity bear different hologram images.

4. A system as in claim 1 wherein the list of unique code numbers is accessible by an owner of the article to enable the owner to verify the authenticity of the article through the unique code number.

5. A system as in claim 1 wherein the article has thereon an autograph.

6. A system as in claim 5 wherein the article is a baseball.

7. A system as in claim 1 wherein the hologram comprises a holographic image on a substrate with an overlying clear thin film and the code number is imprinted on the outer surface of the film.

8. An authentication system for an article comprising the steps of:
   providing an article for which authentication may be desired,
   affixing to the article a hologram with an adhesive so as to be tamper proof,
   providing on the hologram a unique code number,
   providing a certificate of authenticity for the article and including thereon a hologram with an identical unique code number, and
   providing a list of unique numbers with a statement of the respective products to which each of the unique code numbers applies, and providing in the list the unique code number for the article and a brief description of that article.

9. A method as in claim 8 wherein the brief description identifies the article and a feature of the article for which authentication may be desired.

10. A method as in claim 9 wherein the feature is an autograph of a sports personality.

11. In an authentication system for enabling authentication of a product and wherein a list of unique code numbers associated with respective described products is provided, and wherein a certificate of authenticity is provided with the product and with a hologram bearing a unique code number associated with that product, the product comprising an article having at least one unique feature, and having a hologram affixed to the article with an adhesive so as to be tamper proof, and the hologram having imprinted thereon a unique code number, and the unique code number and a brief description of the article being stated in the list.

* * * * *